US012749932B2

(12) United States Patent
Abe et al.

(10) Patent No.: US 12,749,932 B2
(45) Date of Patent: Sep. 29, 2026

(54) MAGNETIC CORE, HOOP MATERIAL, AND MAGNETIC COMPONENT

(71) Applicant: DELTA ELECTRONICS (JAPAN), INC., Tokyo (JP)

(72) Inventors: Munemitsu Abe, Miyagi-ken (JP); Akio Hanada, Niigata-ken (JP); Shokan Yamashita, Niigata-ken (JP); Tatsuya Oba, Miyagi-ken (JP)

(73) Assignee: DELTA ELECTRONICS (JAPAN), INC., Tokyo (JP)

( * ) Notice: Subject to any disclaimer, the term of this patent is extended or adjusted under 35 U.S.C. 154(b) by 617 days.

(21) Appl. No.: 18/172,883

(22) Filed: Feb. 22, 2023

(65) Prior Publication Data

US 2023/0208213 A1 Jun. 29, 2023

Related U.S. Application Data

(63) Continuation of application No. PCT/JP2021/032521, filed on Sep. 3, 2021.

(30) Foreign Application Priority Data

Sep. 9, 2020 (JP) ................................ 2020-151209

(51) Int. Cl.
*H02K 1/02* (2006.01)
*B23K 26/21* (2014.01)
(Continued)

(52) U.S. Cl.
CPC ............... *H02K 1/02* (2013.01); *B23K 26/21* (2015.10); *H02K 15/02* (2013.01); *B23K 2101/36* (2018.08)

(58) Field of Classification Search
CPC ........ H02K 1/02; H02K 15/02; H02K 15/021; H02K 15/022; B23K 26/21; B23K 2101/36
See application file for complete search history.

(56) References Cited

U.S. PATENT DOCUMENTS

| | | | | |
|---|---|---|---|---|
| 2008/0129157 A1* | 6/2008 | Nakano | ...................... | B62J 6/12 310/67 A |
| 2013/0057107 A1* | 3/2013 | Stretz | ..................... | H02K 3/493 29/598 |

(Continued)

FOREIGN PATENT DOCUMENTS

| | | | |
|---|---|---|---|
| CN | 107005104 A | 8/2017 | |
| EP | 0871282 A1 * | 10/1998 | ......... H02K 15/0431 |

(Continued)

OTHER PUBLICATIONS

Azeyanagi, Machine Translation of JP2005086929, Mar. 2005 (Year: 2005).*

(Continued)

*Primary Examiner* — Eric Johnson
(74) *Attorney, Agent, or Firm* — Winston Hsu

(57) ABSTRACT

In a magnetic core including a laminated core in which multiple core thin strips are laminated, the magnetic core includes a cutting mark region formed by cutting tie sticks 212, connected to the core thin strips 511, in a lamination direction of the core thin strips 511, and the cutting mark region 51C is positioned on an inner side than outer peripheries of the core thin strips 511. The core thin strip 511 may include a portion made of a nanocrystal-containing alloy material that is obtained by nano-crystallizing an amorphous alloy material with heat treatment.

19 Claims, 10 Drawing Sheets

(51) Int. Cl.
*H02K 15/02* (2025.01)
*B23K 101/36* (2006.01)

(56) References Cited

U.S. PATENT DOCUMENTS

| | | | | |
|---|---|---|---|---|
| 2017/0229929 | A1* | 8/2017 | Fahrenbach | H02K 1/14 |
| 2019/0238017 | A1 | 8/2019 | Ohira | |
| 2020/0251279 | A1* | 8/2020 | Takanezawa | H01F 1/15358 |
| 2021/0130917 | A1* | 5/2021 | Manabe | C22C 45/008 |

FOREIGN PATENT DOCUMENTS

| | | | | |
|---|---|---|---|---|
| EP | 3229344 | | | 12/2014 |
| JP | 4-117153 | A | | 4/1992 |
| JP | H04-117153 | | | 4/1992 |
| JP | 2005086929 | A | * | 3/2005 |
| JP | 2015-228713 | A | | 12/2015 |
| JP | 2019-134564 | | | 8/2019 |
| JP | 2020-92139 | | | 6/2020 |
| WO | 2016/088264 | | | 6/2016 |
| WO | 2020-126963 | | | 8/2020 |

OTHER PUBLICATIONS

International Search Report from International Application No. PCT/JP2021/032521 dated Nov. 22, 2021.

* cited by examiner

MAGNETIC CORE, HOOP MATERIAL, AND MAGNETIC COMPONENT

CLAIM OF PRIORITY

This application is a Continuation of International Application No. PCT/JP2021/032521 filed on Sep. 3, 2021, which claims benefit of Japanese Patent Application No. 2020-151209 filed on Sep. 9, 2020. The entire contents of each application noted above are hereby incorporated by reference.

BACKGROUND OF THE INVENTION

1. Field of the Invention

The present invention relates to a magnetic core, a hoop material for use in manufacturing the magnetic core, and a magnetic component including the magnetic core.

2. Description of the Related Art

Japanese Unexamined Patent Application Publication No. 4-117153 discloses a laminated iron core manufacturing method including a stamping step of stamping a metallic material by press working to form an iron-core component piece, and a lamination step of integrating multiple iron-core component pieces into an iron core by laminating and joining the iron-core component pieces together, the stamping step including multiple stamping steps using progressive dies, wherein the laminated iron core manufacturing method includes an opening forming step of, prior to stamping the iron-core component piece in conformity with an outer peripheral shape, forming multiple openings that define parts of an outer periphery of the iron-core component piece along an outer peripheral end face such that the metallic material and the iron-core component piece are connected through connecting portions, and a connecting-portion removing step of cutting away the connecting portions to separate the iron-core component piece from the metallic material.

SUMMARY OF THE INVENTION

According to the laminated iron core manufacturing method disclosed in Japanese Unexamined Patent Application Publication No. 4-117153, the connecting portions formed in the opening forming step are positioned at the outer periphery of the iron-core component piece. Therefore, after the connecting portions are cut away in the removing step, parts of the outer periphery of the iron-core component piece are defined by the cutting work. Thus, as illustrated in FIG. 10, in an outermost side surface of a laminated iron core 800 including multiple iron-core component pieces 801, 802, 803, . . . **80*n* laminated one above another, there exists a boundary 830 between an outer side surface (opening-defined outer side surface 810) defined by the outer periphery formed in the opening forming step and an outer side surface (after-removal outer side surface 820**) defined by the outer periphery formed in the removing step.

In some cases in which, as a typical example, a magnetic component including the laminated iron core 800 illustrated in FIG. 10 is a stator, a magnetic path in a magnetic circuit of a magnetic product including the magnetic component passes through the outermost side surface of the laminated iron core 800. In those cases, if the boundary 830 exists in the outermost side surface, there is a concern that magnetic characteristics may become unstable when the magnetic path passes through the boundary 830, thereby affecting stability in operation of the magnetic product.

The present invention provides a magnetic core having a structure that core thin strips are laminated and having easily stabilized magnetic characteristics. The present invention further provides a hoop material for use in manufacturing the magnetic core and a magnetic component including the magnetic core.

According to one aspect, the present invention provides a magnetic core including a laminated core in which multiple core thin strips are laminated, wherein the magnetic core includes a cutting mark region formed by cutting tie sticks, connected to the core thin strips, in a lamination direction of the core thin strips, and the cutting mark region is positioned on an inner side than outer peripheries of the core thin strips.

Thin strip materials (hoop materials) each having a structure that the core thin strip including a section useful as the magnetic core (a section in a magnetic component including the magnetic core through which section a magnetic path passes, a main section) and a base material other than the core thin strip are connected through the tie stick are laminated one above another. In an obtained laminate, the core thin strips are separated from the thin strip materials (hoop materials) by cutting the tie sticks, used as cut portions, which are arrayed in the lamination direction of the core thin strips. Accordingly, influences (magnetic influence and mechanical influence) of cutting work upon the core thin strips can be minimized. When the cutting mark regions formed by the cutting work are positioned on the inner side than the outer peripheries of the core thin strips as described above, the cutting mark regions are not positioned in an outermost side surface of the laminated core composed of the core thin strips laminated one above another. It is, therefore, possible to reduce, particularly, influences of the cutting mark regions upon magnetic characteristics of the magnetic component using the magnetic core that includes the laminated core.

In the above-described magnetic core, the core thin strip may include a portion made of a nanocrystal-containing alloy material that is obtained by nano-crystallizing an amorphous alloy material with heat treatment. Even when physical properties of the thin strip are changed by the heat treatment such that the thin strip material turns to a material on which, for example, the cutting work is difficult to perform, a choice of not performing the heat treatment on the tie sticks in which the cut portions are positioned can be selected, and cutting workability in the tie sticks can be ensured by selecting such a choice.

In the above case, a portion of the core thin strip, the portion including the cutting mark region positioned therein, is preferably made of the amorphous alloy material. When the tie stick is not nano-crystallized and is made of the amorphous alloy material, the tie stick has good cutting workability. Furthermore, when only the core thin strip is heat-treated and the tie stick and the base material connected to the tie stick are made of the amorphous alloy material, the thin strip material can be moved without touching a portion (the core thin strip) of the thin strip material, the portion having become brittle due to the nano-crystallization, by utilizing, as supports, other portions of the thin strip material, namely the base material and the tie sticks, which remain in the same state as before the cutting work even after the heat treatment. Accordingly, the magnetic core can be fabricated without damaging the core thin strips even when the magnetic core is fabricated by a process of laminating the core thin strips after the heat treatment one by one.

A portion of the core thin strip, the portion including the cutting mark region positioned therein, may be made of the nanocrystal-containing alloy material. Even if the cutting workability is reduced in the nanocrystalline alloy portion, the influences of the cutting work upon the core thin strips can be reduced because the tie sticks are used as the cut portions.

In the above-described magnetic core, the laminated core may include a thin strip block in which the core thin strips adjacent to each other in the lamination direction are fixedly joined together in a fixedly joined portion. When the laminated core includes the fixedly joined portion, failures, such as damages, are less likely to occur in an assembly and manufacturing process for the magnetic core because the thin strip block can be handled as an integral unit.

When the magnetic core includes the fixedly joined portion, at least part of the fixedly joined portion may include a portion in which the cutting mark region is positioned. Forming the fixedly joined portion to include the portion in which the cutting mark region is positioned is preferred because influences upon magnetic characteristics of the core thin strips can be reduced even when the fixedly joined portion has different magnetic characteristics from other portions.

In the above case, in the fixedly joined portion, the cutting mark region may be a fusion bonded region. In the fusion bonded region, the material of the thin strips may be heat-denatured in some cases. Even in those cases, since the heat-denatured region is positioned in the cutting mark region, the magnetic characteristics of the magnetic core are less likely to be affected.

When, in the fixedly joined portion, the cutting mark region is the fusion bonded region, the fixedly joined portion is preferably a fusion cut portion by a laser. Since the cut portions of the tie sticks coincide with the fixedly joined portion, characteristic variations in the core thin strips laminated in the thin strip block are reduced, and hence the quality of the magnetic core can be improved.

When the magnetic core includes the fixedly joined portion, the magnetic core preferably includes a core assembly having a structure that a multiple number of the thin strip blocks are arranged. In the magnetic core including the core assembly, comparing with a magnetic core including a laminated core fabricated by laminating nanocrystalline thin strips one by one, failures, such as damages, are less likely to occur in the nanocrystalline thin strips, and hence the quality of the magnetic core obtained by covering the core assembly with an impregnated coating can be increased.

When the magnetic core includes the core assembly, the magnetic core may include a shift-arranged thin strip block group made up of the multiple thin strip blocks arrayed along a first direction, the group including a portion in which the fixedly joined portions of the multiple thin strip blocks are not aligned in the first direction. The fixedly joined portion has different magnetic characteristics from other portions in some cases. Even in those cases, uniformity in the magnetic characteristics of the magnetic core can be increased depending on the case by arranging the thin strip blocks such that the fixedly joined portions included in the core assembly are not aligned in one direction.

In the above-described magnetic core, the laminated core is preferably covered with an impregnated coating. When the laminated core is covered with the impregnated coating, a failure of peeling-off of the thin strips from the laminated core is less likely to occur.

According to another aspect, the present invention provides a hoop material including a core thin strip segment becoming the core thin strip included in the above-described magnetic core, a ribbon-shaped base material segment extending in an in-plane direction of the core thin strip segment, and a tie stick connecting the core thin strip segment and the base material segment.

A multiple number of the core thin strip segments may be each connected to the base material segment through the tie stick. The hoop material may include a positioning portion in the base material segment.

According to another aspect, the present invention provides a magnetic component including the above-described magnetic core. The magnetic component may be a motor stator or a motor rotor.

DESCRIPTION OF THE PREFERRED EMBODIMENTS

Embodiments of the present invention will be described below with reference to the drawings. In the following description, the same members are denoted by the same signs, and duplicate description of the members that have been explained once is omitted as appropriate.

Figure 1A:
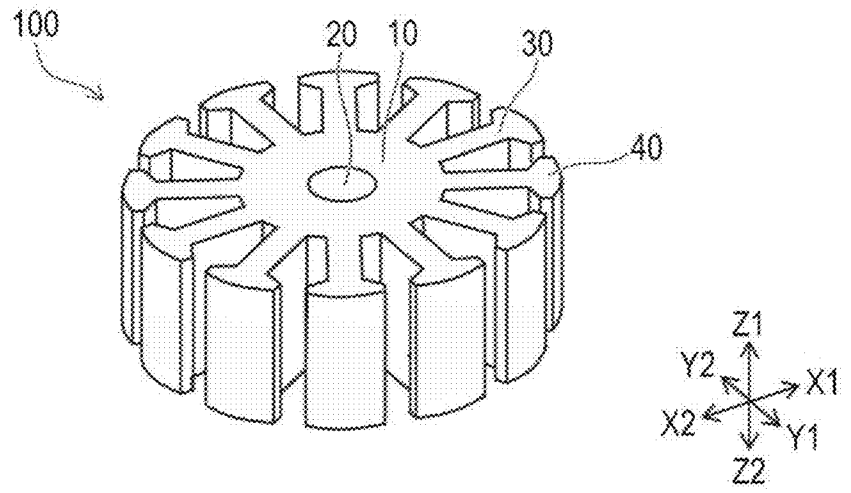
FIG. 1A is a perspective view illustrating a magnetic core according to an embodiment of the present invention.
Figure 1B:
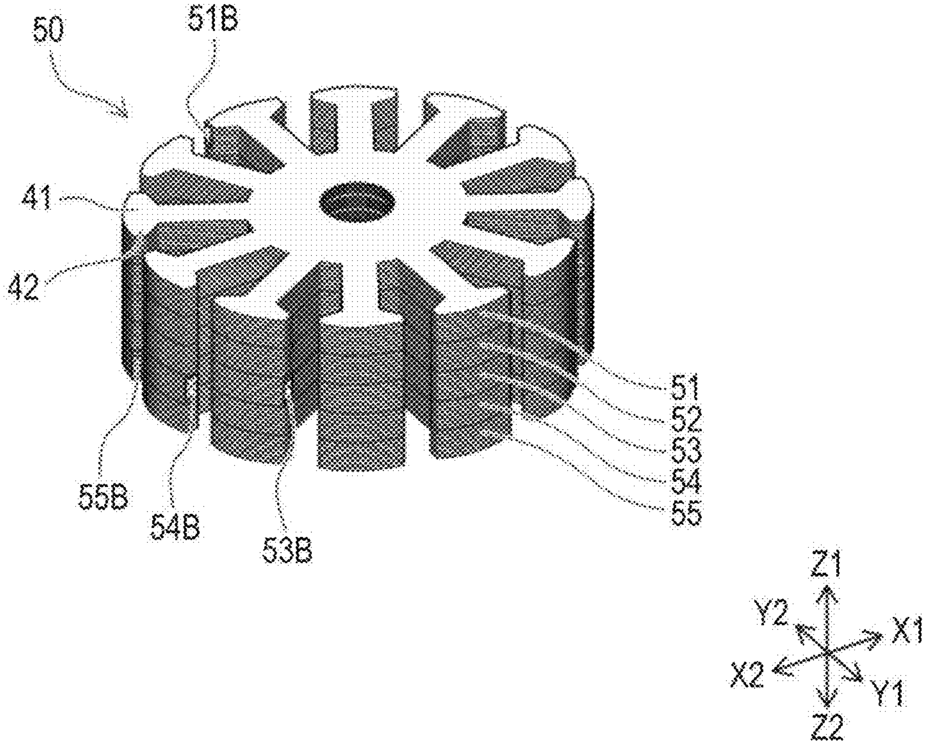
FIG. 1B illustrates a core assembly included in the magnetic core illustrated in FIG. 1A.
Figure 2A:
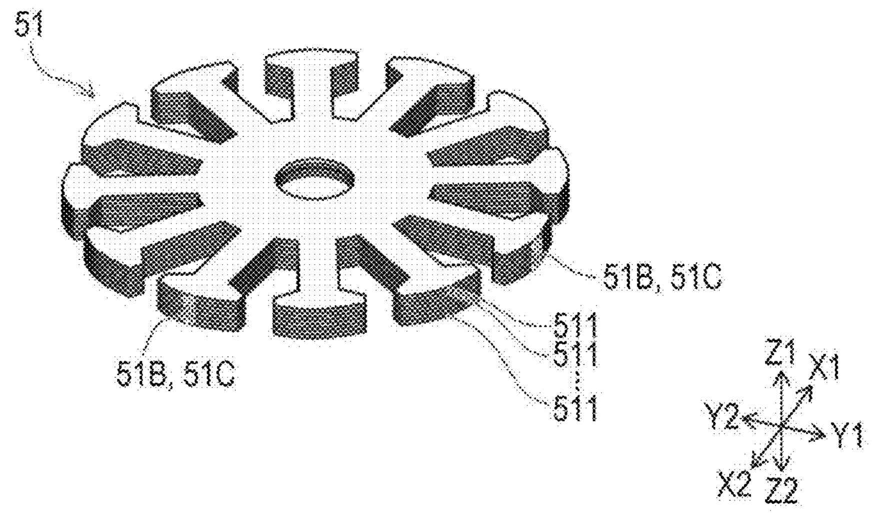
FIG. 2A illustrates a thin strip block included in the core assembly illustrated in FIG. 1B.
Figure 2B:
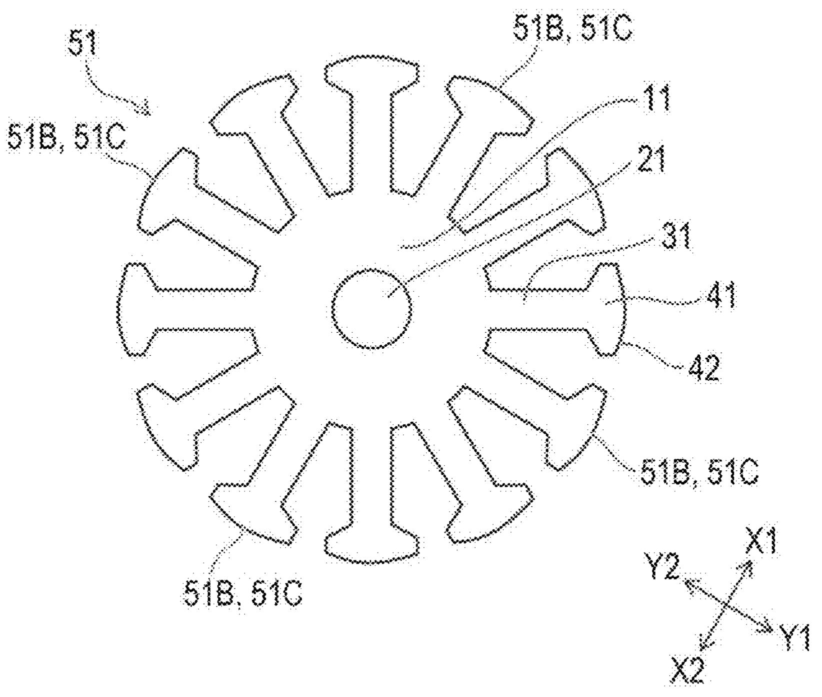
FIG. 2B is a plan view of the thin strip block.

FIG. 1A is a perspective view illustrating a magnetic core according to an embodiment (first embodiment) of the present invention. FIG. 1B illustrates a core assembly included in the magnetic core illustrated in FIG. 1A. FIG. 2A illustrates a thin strip block included in the core assembly illustrated in FIG. 1B. FIG. 2B is a plan view of the thin strip block.

As illustrated in FIG. 1A, the magnetic core 100 according to the first embodiment has the shape of a motor stator. More specifically, the magnetic core 100 includes a cylindrical body portion 10 with a through-hole 20 passing a center axis along a Z1-Z2 direction, and multiple teeth 30 extending radially from an outer side surface of the cylindrical body portion 10 (in a direction within an XY plane). The magnetic core 100 illustrated in FIG. 1 includes twelve teeth 30, and each of the teeth 30 has a distal end portion 40 with a protrusion protruding in a circumferential direction and positioned at an outer end of each tooth 30.

The magnetic core 100 is obtained by forming an impregnated coating on the core assembly 50 (laminated core), illustrated in FIG. 1B, which is in the form of a soft magnetic body. The impregnated coating is formed by applying a coating material, provided as a resin material, to adhere to a surface of the core assembly 50, thus making the surface impregnated with the resin material. The coating material is made of, for example, epoxy resin. A thickness of the impregnated coating is set such that the impregnated coating properly covers the core assembly 50 being a conductor and gives the magnetic core 100 with appropriate insulation. In an example not intended to impose any limitations, the thickness of the impregnated coating is from 0.1 μm to 5 μm.

The core assembly 50 is composed of multiple thin strip blocks 51. The core assembly 50 illustrated in FIG. 1B is constituted by a laminate of five thin strip blocks 51, 52, 53, 54 and 55 laminated in the Z1-Z2 direction.

The thin strip block 51 is a laminate of multiple nanocrystalline thin strips 511 (core thin strips). The nanocrystalline thin strips 511 are made of a nanocrystal-containing alloy material. In other words, the magnetic core 100 includes the laminated core (the core assembly 50) in which the core thin strips (the nanocrystalline thin strips 511) are laminated one above another. The thin strip block 51 illustrated in FIG. 2A is a laminate of a number n of the nanocrystalline thin strips 511 laminated in the Z1-Z2 direction. As illustrated in FIG. 2B, a shape of the thin strip block 51 in the plan view (when viewed from the Z1-Z2 direction) is similar to that of the magnetic core 100. More specifically, the thin strip block 51 includes a penetrating portion 21 at a center of a circular body portion 11, and twelve teeth 31 extending radially from an outer side surface of the body portion 11. Each of the teeth 31 has a distal end portion 41 with a protrusion protruding in a circumferential direction and positioned at an outer end of each tooth 31.

The thin strip block 51 includes a fixedly joined portion 51B in which the nanocrystalline thin strips adjacent to each other in a lamination direction (Z1-Z2 direction) are fixedly joined together. In the thin strip block 51 illustrated in FIG. 2A, the fixedly joined portion 51B is disposed in one circumferential side surface of each of the protrusion 42 in the distal end portions 41 of the teeth 31. In this embodiment, the fixedly joined portion 51B coincides with a portion in which a cutting mark region 51C formed by laser fusion cutting is positioned.

As described above, the core assembly 50 illustrated in FIG. 1B is fabricated by arranging the multiple thin strip blocks 51 each of which is prepared as an integrated body of the multiple nanocrystalline thin strips 511. Because of using the thin strip block 51, failures, such as damages, are less likely to occur in the nanocrystalline thin strips than in the case in which a laminated core is formed by laminating the nanocrystalline thin strips one by one. As a result, the quality of the magnetic core 100 obtained by forming the impregnated coating on the core assembly 50 can be increased.

Furthermore, an overall size of the core assembly 50 can be easily adjusted by changing the number of the arranged thin strip blocks 51, specifically the number of the laminated blocks, which are easy to handle. Therefore, the magnetic cores 100 with different magnetic characteristics can be easily fabricated. In addition, since the magnetic characteristics of the magnetic core 100 can be changed just by changing the number of the laminated thin strip blocks in the core assembly 50, change in the magnetic characteristics of the magnetic core 100 can be realized without changing heat treatment conditions for the laminate of the amorphous thin strips. Because, as described above, the heat treatment conditions need to be newly set whenever the number of the amorphous thin strips forming the laminate is changed, the magnetic core 100 according to this embodiment is superior in stability of quality and productivity to a magnetic core that is manufactured by using a method changing the number of the laminated thin strips in the laminate.

Because, as described above, the fixedly joined portion 51B of the thin strip block 51 is a laser fusion cut portion formed by the laser fusion cutting and coincides with the portion in which the cutting mark region 51C is positioned, the adjacent nanocrystalline thin strips 511 and 511 are electrically connected to each other through the fixedly joined portion 51B. Therefore, when an eddy current flows in the magnetic core 100, a short circuit path of the eddy current is formed in units of the thin strip block 51. Thus, since the core assembly 50 of the magnetic core 100 has a structure that the multiple thin strip blocks 51 are arranged, the short circuit path is formed in units of the thin strip block 51. Accordingly, an eddy current loss generated in the magnetic core 100 can be relatively reduced.

The cutting mark region 51C does not always need to be positioned in the fixedly joined portion 51B. In a practical example of that case, cutting to form the nanocrystalline thin strip 511 is performed by machining, and the fixedly joined portion 51B is formed by laser welding. There are no limitations on a fixedly joining method used in forming the fixedly joined portion 51B. The adjacent nanocrystalline thin strips in the thin strip block 51 may be fixedly joined with an adhesive.

The core assembly 50 illustrated in FIG. 1B includes a shift-arranged thin strip block group including a portion in which respective fixedly joined portions 51B, 52B, 53B, 54B, and 55B of the five thin strip blocks 51, 52, 53, 54, and 55 arrayed along a first direction (Z1-Z2 direction) are not aligned in the first direction (Z1-Z2 direction). As illustrated in FIG. 2B, the thin strip block 51 includes four fixedly joined portions 51B that are positioned at the protrusions 42 in the distal end portions 41 of the teeth 31 and that are arranged in every third tooth of the twelve teeth 31 of the thin strip block 51. Moreover, in two adjacent thin strip blocks (for example, the thin strip blocks 51 and 52) in the core assembly 50, the two fixedly joined portions 51B and 52B are not aligned in the first direction (Z1-Z2 direction). With the thin strip blocks 51, 52, 53, 54, and 55 arranged in the core assembly 50 as described above, even when the fixedly joined portions 51B, 52B, 53B, 54B, and 55B have different magnetic properties from other portions, it is expected that spatial variations in the magnetic characteristics of the core assembly 50 are less likely to occur.

In this embodiment, the nanocrystalline thin strip 511 is a thin strip made of a nanocrystal-containing alloy material that is obtained by nano-crystallizing an amorphous thin strip made of an amorphous alloy material with heat treatment. More specifically, a nanocrystal contained in the nanocrystalline thin strip has a bcc-Fe phase as a main phase. As described later, the nanocrystalline thin strips 511 forming the thin strip block 51 are obtained by heat-treating the laminate of the amorphous thin strips corresponding to the thin strip block 51 at a time.

A thickness of the thin strip block 51 is set to a value at which the nanocrystalline thin strips 511 can be produced from the amorphous thin strips with the heat treatment. As a thickness of the laminate of the amorphous thin strips increases, heat generated due to crystallization of the amorphous thin strips is harder to be released to the outside of the laminate, and controllability of the heat treatment reduces. From the viewpoint of causing the heat treatment to progress properly, therefore, an upper limit is preferably set for the thickness of the thin strip block 51. On the other hand, because the nanocrystalline thin strip 511 produced with the heat treatment is hard and brittle, the laminate produced with the heat treatment preferably includes a certain number of the laminated nanocrystalline thin strips 511 from the viewpoint of increasing ease of handling. In consideration of the above point, a lower limit is preferably set for the thickness of the thin strip block 51.

In an example not intended to impose any limitations, the thickness of the thin strip block 51 is preferably 3 mm or less and more preferably 2 mm or less in some cases. In addition, the thickness of the thin strip block 51 is preferably 200 μm or more and more preferably 500 μm or more in some cases.

Figure 3:
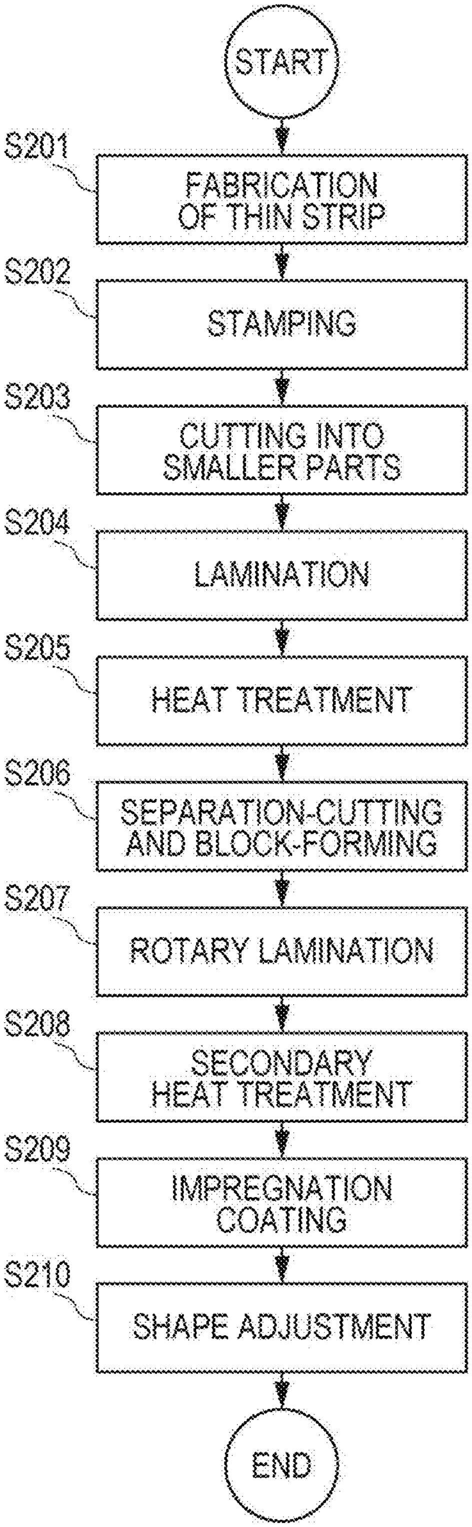
FIG. 3 is a flowchart illustrating one example of a manufacturing method for the magnetic core according to the embodiment of the present invention.
Figure 6A:
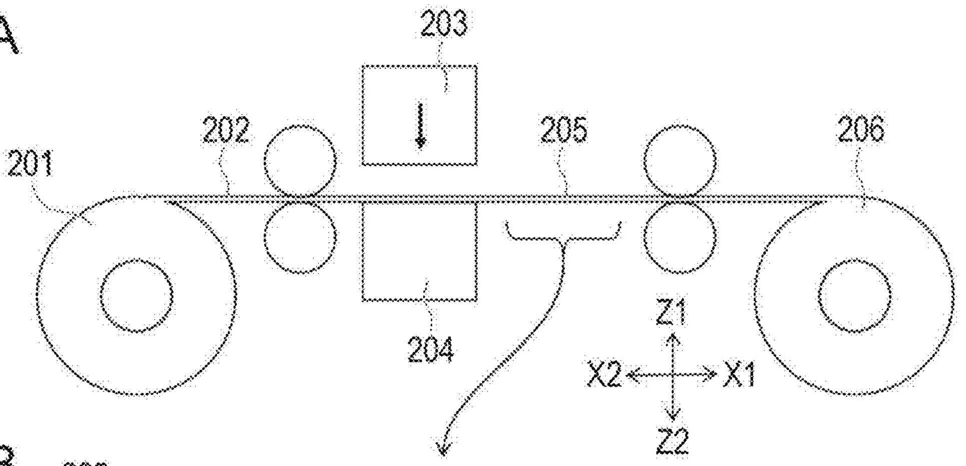
FIG. 6A is an explanatory view of a manufacturing process for a hoop material made of a ribbon of amorphous thin strip to form nanocrystalline thin strips included in the magnetic core according to the embodiment of the present invention.
Figure 6B:
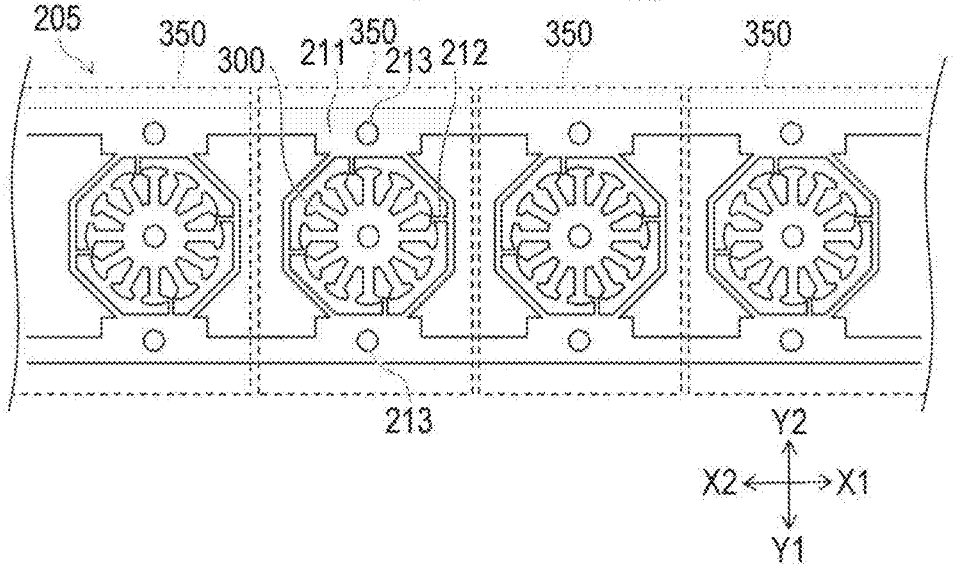
FIG. 6B is an explanatory view illustrating a configuration of the hoop material made of the ribbon of amorphous thin strip and manufactured by the manufacturing process illustrated in FIG. 6A.
Figure 6C:
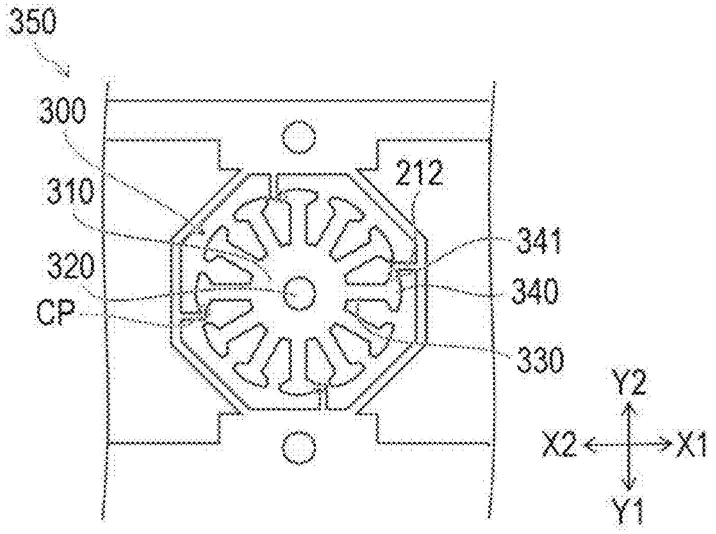
FIG. 6C is an explanatory view illustrating a stamped section of the hoop material made of the ribbon of amorphous thin strip, illustrated in FIG. 6B.
Figure 7A:
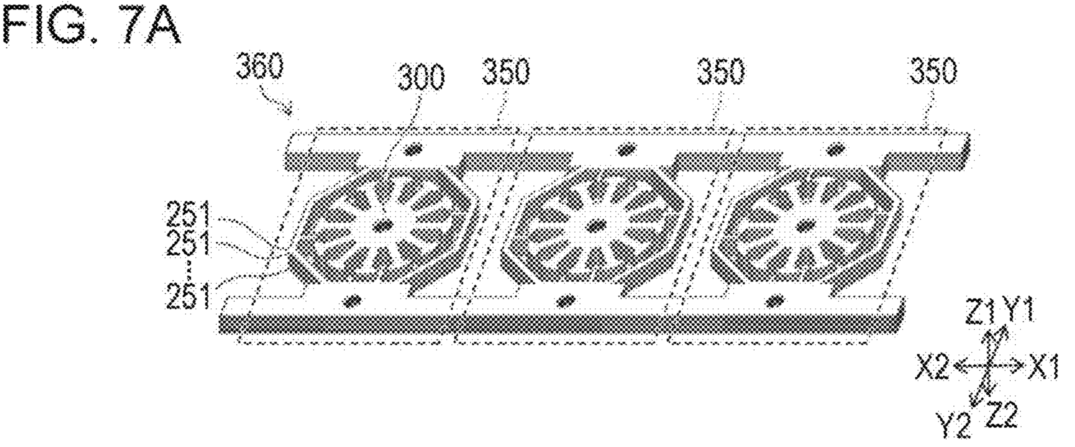
FIG. 7A illustrates a coupled laminate that is obtained after dividing the hoop material made of the ribbon of amorphous thin strip, illustrated in FIG. 6B, into smaller parts.
Figure 7B:
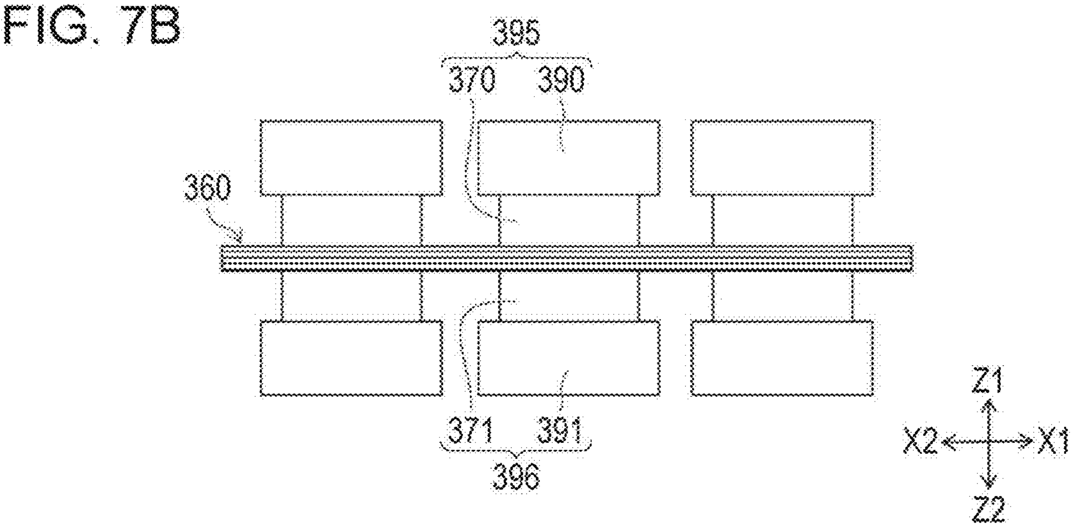
FIG. 7B is an explanatory view of heat treatment of the coupled laminate illustrated in FIG. 7A.
Figure 7C:
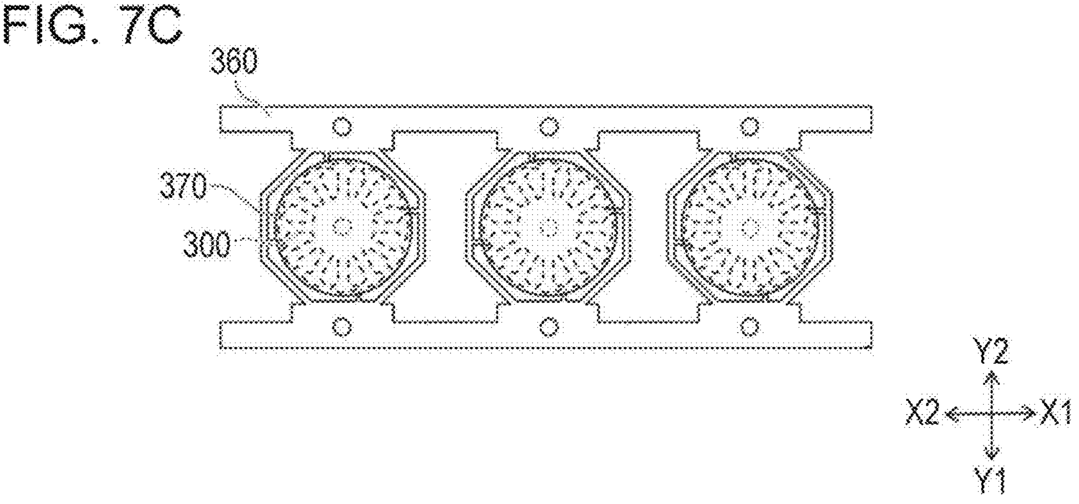
FIG. 7C illustrates an arrangement of heat treatment apparatuses used in the heat treatment illustrated in FIG. 7B.

There are no limitations on a manufacturing method for the magnetic core 100 according to this embodiment, but the magnetic core 100 can be manufactured with high productivity when the following method is used to manufacture the magnetic core 100. FIG. 3 is a flowchart illustrating an example of the manufacturing method for the magnetic core according to the embodiment of the present invention. FIG. 6A is an explanatory view of a manufacturing process for a hoop material made of a ribbon of amorphous thin strip to form nanocrystalline thin strips included in the magnetic core according to the embodiment of the present invention. FIG. 6B is an explanatory view illustrating a configuration of the hoop material made of the ribbon of amorphous thin strip and manufactured by the manufacturing process illustrated in FIG. 6A. FIG. 6C is an explanatory view illustrating a stamped section of the hoop material made of the ribbon of amorphous thin strip, illustrated in FIG. 6B. FIG. 7A illustrates a coupled laminate that is obtained after dividing the hoop material made of the ribbon of amorphous thin strip, illustrated in FIG. 6B, into smaller parts. FIG. 7B is an explanatory view of heat treatment of the coupled laminate illustrated in FIG. 7A. FIG. 7C illustrates an arrangement of heat treatment apparatuses used in the heat treatment illustrated in FIG. 7B.

In the manufacturing method illustrated in the flowchart of FIG. 3, the ribbon of amorphous thin strip is first fabricated by, for example, a single-roll method (step S201). With the obtained ribbon of amorphous thin strip having higher toughness than the nanocrystalline thin strip, the obtained ribbon of amorphous thin strip is coiled into a roll (amorphous roll 201).

Then, a hoop material 205 is fabricated by stamping (step S202). FIG. 6A illustrates a roll-to-roll method of fabricating the hoop material 205. The ribbon of amorphous thin strip 202 is unrolled from the amorphous roll 201 in one direction (specifically, toward an X1 side in an X1-X2 direction), and the stamping is performed on the ribbon of amorphous thin strip 202 with stamping dies (an upper die 203 and a lower die 204).

As illustrated in FIG. 6B, the obtained hoop material 205 includes stamped sections 350 each including the core thin strip segment 300 that finally becomes a substantial constituent member of the magnetic core 100, a base material segment 211 that extends in an in-plane direction of the core thin strip segment 300 (specifically, in the X1-X2 direction), and tie sticks 212 that connect the core thin strip segment 300 and the base material segment 211. The stamped sections 350 are arranged side by side in an extension direction of the base material segment 211 (in the X1-X2 direction). Positioning holes (positioning portions 213) are formed in the base material segment 211.

As illustrated in FIG. 6C, a shape of the core thin strip segment 300 of the stamped section 350 in the plan view (when viewed from the Z1-Z2 direction) is similar to that of the thin strip block 51. More specifically, the core thin strip segment 300 includes a penetrating portion 320 formed at a center of a circular body portion 310, and twelve teeth 330 extending radially from an outer side surface of the body portion 310. Each of the teeth 330 has a distal end portion 340 with a protrusion 341 protruding in a circumferential direction and positioned at an outer end of each tooth 330. As illustrated in FIG. 6C, some of the tie sticks 212 are connected to the protrusions 341 protruding in the circumferential direction (Y1-Y2 direction) in the distal end portions 340 of the two teeth 330 that extend along the X1-X2 direction. Some other of the tie sticks 212 are connected to the protrusions 341 protruding in the circumferential direction (X1-X2 direction) in the distal end portions 340 of the two teeth 330 that extend along the Y1-Y2 direction. Thus, cut portions CP of the tie sticks 212 are not positioned in connection with the outermost side surfaces of the distal end portions 340, those outermost side surfaces defining an outer periphery of the nanocrystalline thin strip 511 (the core thin strip) after the cutting at the tie sticks 212. In the thin strip block 51 obtained using the stamped section 350 illustrated in FIG. 6C, therefore, the fixedly joined portions 51B (namely, the cutting mark regions 51C) are not positioned in the outermost side surfaces of the distal end portions 340 as illustrated in FIG. 2A.

Regardless of whether a cutting method is laser cutting or mechanical cutting, a crystal state in the cutting mark region 51C may be changed from that in other regions. This raises a possibility that the magnetic characteristics of the magnetic core 100 in a portion in which the cutting mark region

51C is positioned may become different from those in other portions. Accordingly, when the magnetic path in the magnetic circuit of the magnetic component including the magnetic core 100 passes through the cutting mark region 51C, there is a possibility that the magnetic characteristics may be changed in the cutting mark region 51C and hence stability of the magnetic characteristics of the magnetic component may be affected. The resulting influence can be minimized by optimizing the cutting method. In the magnetic circuit of the magnetic component using the magnetic core 100 that includes the thin strip block 51, the magnetic path passes while penetrating through the outermost side surface of the thin strip block 51 in some cases. However, since the core assembly 50 is obtained by using the stamped section 350 illustrated in FIG. 6C, for example, the possibility of passing of the magnetic path in the magnetic circuit of the magnetic component through the cutting mark region 51C can be further reduced.

The hoop material 205 obtained by the stamping is coiled into a rolled material 206. Then, the hoop material 205 is unrolled from the rolled material 206 and is cut into smaller parts, whereby a coupled member 251 including a predetermined number (for example, three) of the stamped sections 350 coupled together is obtained (step S203). As illustrated in FIG. 7A, thus-obtained multiple coupled members 251 are laminated one above another in the Z1-Z2 direction, and a coupled laminate 360 is obtained (step S204). Here, the coupled members 251 can be conveyed without directly touching the core thin strip segments 300 by supporting the base material segments 211 of the coupled members 251. Furthermore, by utilizing the positioning portions 213 in each of the coupled members 251, the coupled members 251 can be easily laminated in the Z1-Z2 direction without directly touching the core thin strip segments 300.

Then, heat treatment of the obtained coupled laminate 360 is performed (step S205). As illustrated in FIGS. 7B and 7C, multiple sets of heat treatment apparatuses 395 and 396 are prepared corresponding to the number of the laminates of the core thin strip segments 300 included in the coupled members 251 forming the coupled laminate 360, and the laminates of the core thin strip segments 300 are sandwiched respectively between the sets of the heat treatment apparatuses 395 and 396 in a lamination direction of the coupled laminate 360 (in the Z1-Z2 direction). On that occasion, positioning between the laminate of the core thin strip segments 300 and the set of the heat treatment apparatuses 395 and 396 is needed. Even in the case in which the laminate of the core thin strip segments 300 includes no positioning members, however, the positioning between the laminate of the core thin strip segments 300 and the set of the heat treatment apparatuses 395 and 396 can be made by performing positioning between the positioning portions 213 in the base material segment 211 and the set of the heat treatment apparatuses 395 and 396, positions of the positioning portions 213 relative to the core thin strip segment 300 through the tie sticks 212 being determined in advance.

The heat treatment apparatuses 395 and 396 are to control temperature of the core thin strip segments 300 and include, respectively, heat reservoirs 370 and 371 that have a substantially columnar shape and that come into direct contact with the core thin strip segments 300, and heater blocks 390 and 391 that heat the heat reservoirs 370 and 371. Thus, the heat treatment apparatuses 395 and 396 have not only the function of applying heat to the core thin strip segments 300, but also the function of receiving heat from the core thin strip segments 300. Since the multiple sets of the heat treatment apparatuses 395 and 396 are disposed as described above, conditions of the heat treatment applied to the laminates of the core thin strip segments 300 included in the coupled laminate 360 can be held equal. The heat treatment conditions are set such that the crystallization properly progresses in all the amorphous thin strips forming the core thin strip segments 300 in the coupled laminate 360, and that failures (for example, generation of unnecessary matters, such as chemical compounds, and burning) caused by the heat generated due to the crystallization are properly suppressed.

Figure 8A:
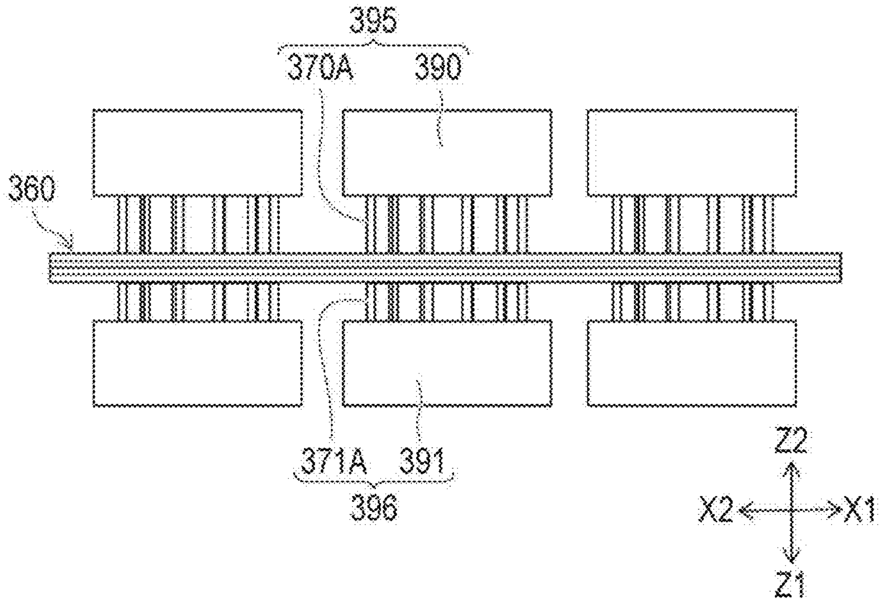
FIG. 8A is an explanatory view illustrating a modification of the heat treatment of the coupled laminate illustrated in FIG. 7B.
Figure 8B:
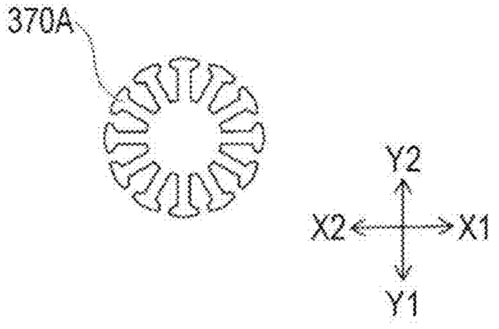
FIG. 8B is a plan view illustrating a shape of a heat reservoir used in the heat treatment illustrated in FIG. 8A.

FIG. 8A is an explanatory view illustrating a modification of the heat treatment of the coupled laminate illustrated in FIG. 7B, and FIG. 8B is a plan view illustrating a shape of a heating member used in the heat treatment illustrated in FIG. 8A.

When the heat reservoirs 370 and 371 included in the heat treatment apparatuses 395 and 396 have the substantially columnar shape as illustrated in FIG. 7B, the cut portions CP (see FIG. 6C) come into direct contact with the heat reservoir 370 as illustrated in FIG. 7C. In the coupled laminate 360 after the heat treatment step (step S205), therefore, the cut portions CP are also heat-treated and crystallized. Accordingly, there is a possibility that cutting workability may be reduced in the cut portions CP. As described above, the possibility of the magnetic path passing through the protrusions 341 to which the cut portions CP are connected is low. However, if the cutting workability is reduced, this may reduce uniformity in shape of the cutting mark regions 51C and may affect retention of shape quality of the thin strip block 51 in some cases.

On the other hand, when, as illustrated in FIGS. 8A and 8B, a shape of each of heat reservoirs 370A and 371A in the plan view (when viewed from the Z1-Z2 direction) corresponds to the shape of the core thin strip segment 300 in the plan view, a portion of the tie stick 212, the portion being connected to the protrusion 341 of the distal end portion 340, is not heat-treated in the heat treatment step (step S205), and the amorphous alloy material remains there. Accordingly, the tie stick 212 still has good cutting workability. In consideration of the above point, the laser fusion cutting is performed on the portions (the cut portions CP) of the tie sticks 212 connected to the distal end portions 340 of the teeth 330 to separate each laminate of the core thin strip segments 300 (the nanocrystalline thin strips 511) and to fixedly join the nanocrystalline thin strips 511 forming the separated laminate together. As a result, the thin strip block 51 illustrated in FIG. 2A is obtained (step S206). Thus, the fixedly joined portion 51B of the thin strip block 51 manufactured by the manufacturing method illustrated in the flowchart of FIG. 3 is also the cutting mark region 51C. The cutting mark region 51C is formed by cutting, in the lamination direction of the core thin strips (the nanocrystalline thin strips 511), the tie sticks 212 connected to the core thin strips (the nanocrystalline thin strips 511) included in the thin strip block 51.

Then, the multiple thin strip blocks 51 obtained as described above are laminated one above another, and the core assembly 50 illustrated in FIG. 1B is obtained. At that time, rotary lamination of rotating, relative to one thin strip block 51, another thin strip block 52 adjacent to the former about a center axis of the penetrating portion 21 is performed such that the adjacent fixedly joined portions (for example, the fixedly joined portion 51B and the fixedly joined portion 52B) are not aligned in the first direction (Z1-Z2 direction) (step S207).

Secondary heat treatment is performed on the core assembly 50 as required (step S208), and impregnation coating is then performed on the core assembly 50 (step S209), whereby the magnetic core 100 illustrated in FIG. 1A is obtained. After the impregnation coating, shape adjustment such as deburring is performed as required in some cases (step S210).

Figure 4:
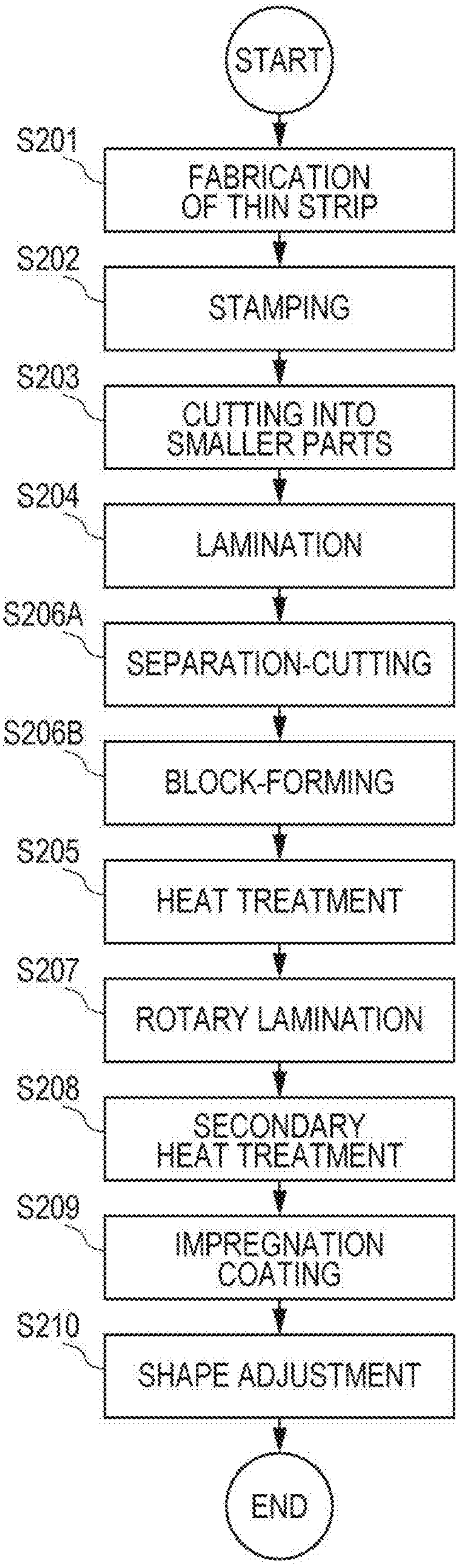
FIG. 4 is a flowchart illustrating another example of the manufacturing method for the magnetic core according to the embodiment of the present invention.

While the laser fusion cutting is used in the manufacturing method illustrated in FIG. 3 to perform the cutting step and the block-forming step at the same time, those steps may be performed as separate steps. FIG. 4 is a flowchart illustrating another example of the manufacturing method for the magnetic core according to the embodiment of the present invention.

Comparing with the flowchart illustrated in FIG. 3, the flowchart illustrated in FIG. 4 is different in that the "separation-cutting and block-forming" step of the step S206 is divided into a separation-cutting step (step S206A) and a block-forming step (step S206B). In this case, the separation-cutting step is performed by, for example, mechanical cutting, and the block-forming step is performed, for example, by laser welding. Furthermore, in the flowchart illustrated in FIG. 4, comparing with the flowchart illustrated in FIG. 3, the heat treatment step (step S205) is performed after the block-forming step (step S206B). When a portion made of the amorphous alloy is subjected to the heat treatment step (step S205), the amorphous alloy is nano-crystallized, and the cutting workability in such a portion is reduced. Thus, when the separation-cutting step (step S206A) is performed before the heat treatment step (step S205), good cutting workability can be easily ensured for the tie stick 212. Moreover, when the amorphous thin strip is crystallized with the heat treatment and turns to the nanocrystalline thin strip 511, the thin strip becomes brittle, and ease in handling the thin strip is reduced. However, by performing the block-forming step (step S206B) before the heat treatment step (step S205), easy handling can be ensured because a product obtained with the heat treatment is the thin strip block 51 in which the nanocrystalline thin strips 511 are laminated and fixedly joined together.

Figure 5:
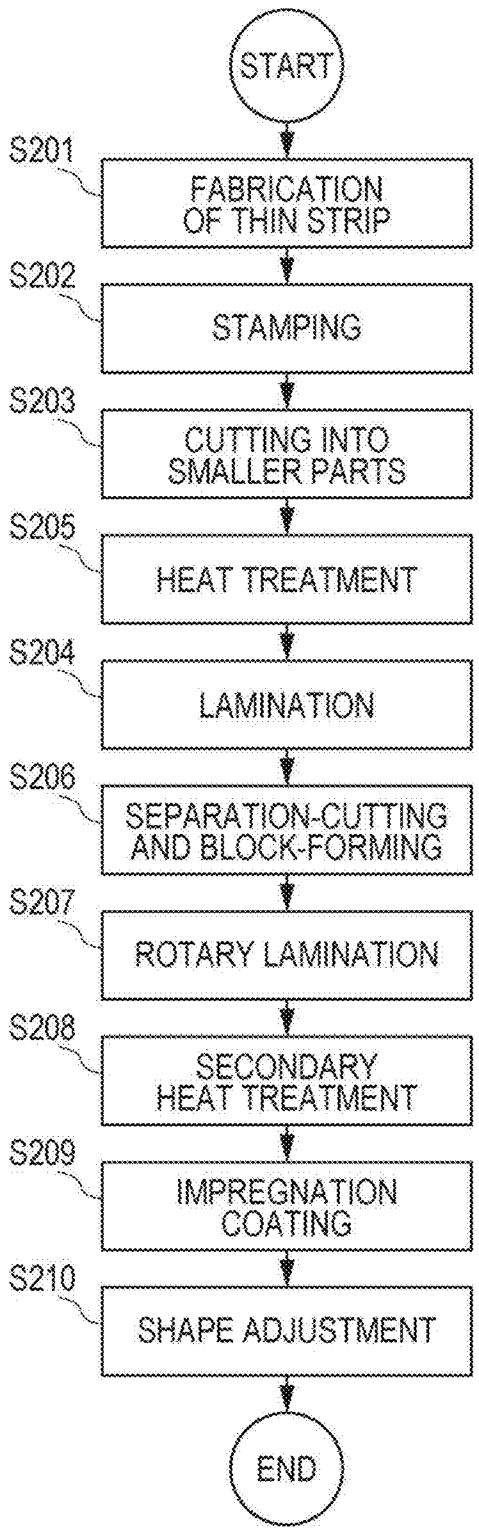
FIG. 5 is a flowchart illustrating still another example of the manufacturing method for the magnetic core according to the embodiment of the present invention.

While, in the manufacturing method illustrated in FIG. 3, the heat treatment is performed on the coupled laminate 360 obtained by laminating the coupled members 251 one above another, the present invention is not limited to that case. The coupled members 251 may be laminated after heat-treating each coupled member. FIG. 5 is a flowchart illustrating still another example of the manufacturing method for the magnetic core according to the embodiment of the present invention.

In the flowchart illustrated in FIG. 5, comparing with the flowchart illustrated in FIG. 3, the order of the "lamination" step of the step S204 and the "heat treatment" step of the step S205 is swapped, and the lamination is performed after the heat treatment.

In such a case, the coupled member 251 is heat-treated to change the material of each of the core thin strip segments 300 included in the coupled member 251 from the amorphous alloy material to the nanocrystal-containing alloy material. With the change of the material, the core thin strip segment 300 becomes brittle, and a possibility of the occurrence of damages increases if the core thin strip sections 300 are each moved alone to be laminated one above another. However, because the core thin strip segment 300 made of the nanocrystal-containing alloy material is integrally connected to the base material segment 211 made of the amorphous alloy material through the tie sticks 212 made of the amorphous alloy material, the core thin strip segment 300 can be conveyed safely (in a state in which a risk of the damages is sufficiently reduced) by supporting the base material segments 211.

After the heat treatment (step S205), the coupled members 251 are laminated one above another, and the coupled laminate 360 including the core thin strip segments 300 made of the nanocrystal-containing alloy material is obtained (step S204). Because the tie sticks 212 in the obtained coupled laminate 360 are not subjected to the heat treatment, the material of the tie sticks 212 remains as the amorphous alloy material. Therefore, the tie sticks 212 still have good cutting workability. Accordingly, the thin strip block 51 illustrated in FIG. 2A can be obtained by performing the laser fusion cutting on the portions (the cut portions CP) of the tie sticks 212 connected to the distal end portions 340 of the teeth 330 to separate each laminate of the core thin strip segments 300 (the nanocrystalline thin strips 511) and to fixedly join the nanocrystalline thin strips 511 forming the separated laminate together (S206). Thus, the fixedly joined portion 51B of the thin strip block 51 manufactured by the manufacturing method illustrated in the flowchart of FIG. 5 is also the cutting mark region 51C.

Figure 9A:
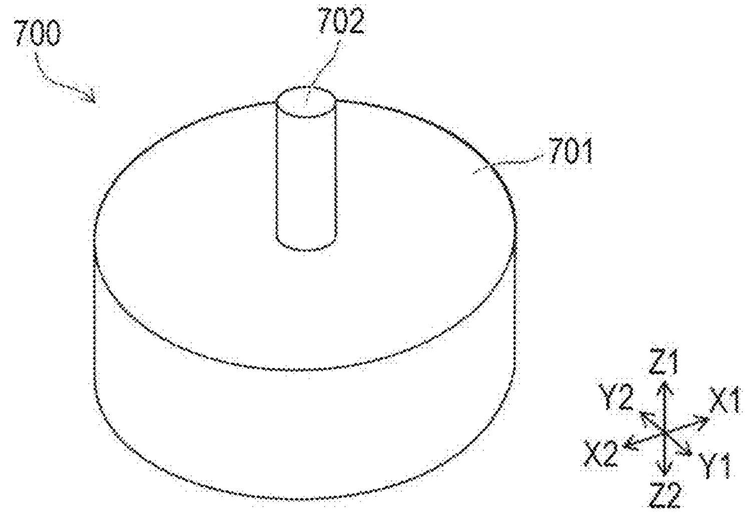
FIG. 9A is an external view of a motor that is an example of a magnetic product in which a magnetic component including the magnetic core according to the embodiment of the present invention is used.
Figure 9B:
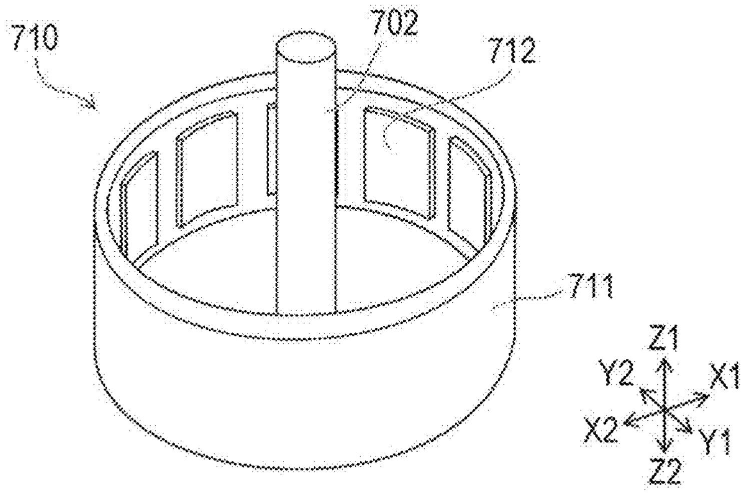
FIG. 9B is an external view of a rotor that is one of magnetic components included in the motor illustrated in FIG. 9A.
Figure 9C:
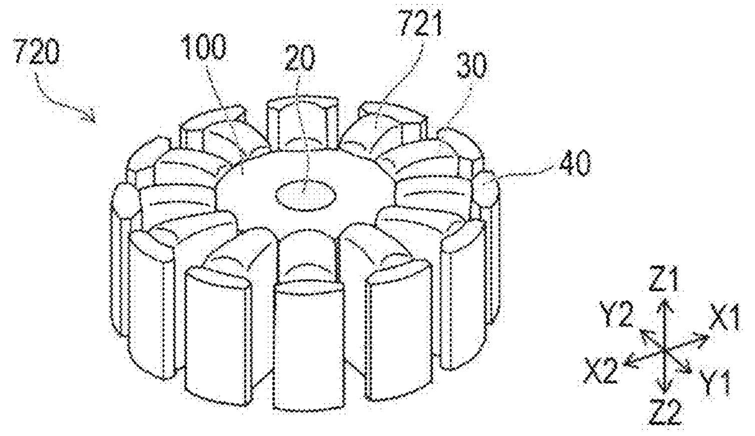
FIG. 9C is an external view of a stator that is another one of the magnetic components included in the motor illustrated in FIG. 9A.
Figure 10:
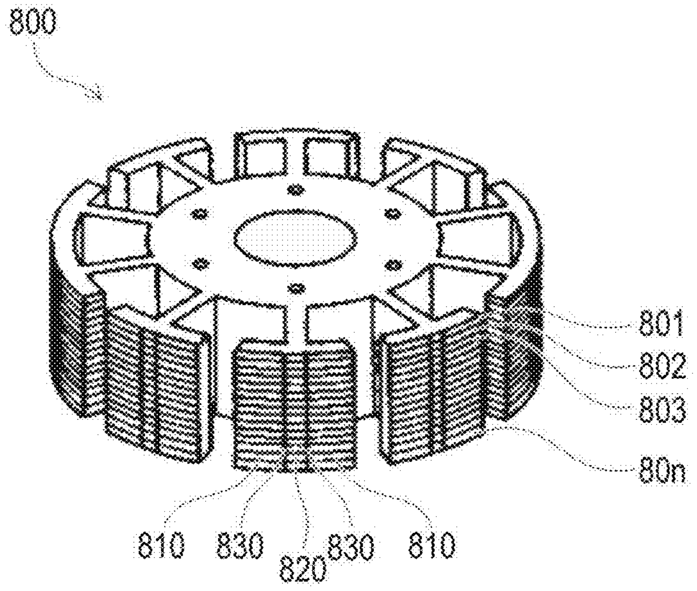
FIG. 10 RELATED ART
FIG. 10 is an explanatory view of a laminated iron core of related art.

FIG. 9A is an external view of a motor that is an example of a magnetic product in which a magnetic component including the magnetic core according to the embodiment of the present invention is used. FIG. 9B is an external view of a rotor that is one of magnetic components included in the motor illustrated in FIG. 9A. FIG. 9C is an external view of a stator that is another one of the magnetic components included in the motor illustrated in FIG. 9A. As illustrated in FIG. 9A, the motor 700 includes a motor body 701 in a cylindrical shape, and a rotating shaft 702 passing a center of a bottom surface of the motor body 701 and protruding from the motor body 701 toward a Z1 side in the Z1-Z2 direction.

The rotor 710 illustrated in FIG. 9B is disposed inside the motor body 701 to be rotatable about a rotation axis extending in the Z1-Z2 direction. The rotor 710 includes a rotor body 711 in a hollow columnar shape with one of bottom surfaces (on the Z1 side in the Z1-Z2 direction) being open, and the rotating shaft 702 fixed to a central portion of the other bottom surface (on a Z2 side in the Z1-Z2 direction) of the rotor body 711. Multiple magnets 712 are arranged on an inner wall of the rotor body 711 side by side in a circumferential direction.

The stator 720 in a columnar external shape is disposed between the rotor body 711 and the rotating shaft 702 of the rotor 710. The stator 720 is composed of the magnetic core 100 according to the embodiment of the present invention, and coils 721 wound around the teeth 30 of the magnetic core respectively. The rotating shaft 702 is inserted through the through-hole 20 of the magnetic core 100. The magnets 712 of the rotor 710 are disposed on the inner wall of the rotor body 711 to face the distal end portions 40 of the teeth 30 of the magnetic core 100 in one-to-one correspondence.

The magnetic core 100 according to the embodiment of the present invention has good magnetic characteristics because the core assembly 50 including the thin strip blocks 51 laminated one above another, each of the thin strip blocks 51 being the laminate of the nanocrystalline thin strips 511 fixedly joined together in the fixedly joined portions 51B, is firmly integrated by the impregnated coating. More specifically, the thin strip blocks 51 included in the core assembly 50 are magnetically connected but are not electrically connected, and hence the eddy current loss is small. Furthermore, in the core assembly 50 of the magnetic core 100, since the fixedly joined portion 51B (the cutting mark region) is not disposed in the outermost side surfaces of the distal end portions 41, those outermost side surfaces defining the outer peripheries of the nanocrystalline thin strips 511 (the core thin strips), the magnetic circuit in the motor 700 is easily stabilized. It is therefore expected that, particularly, rotation characteristics of the motor 700 are stabilized.

The above embodiments are described with intent to make easier understanding of the present invention and not to limit the present invention. Thus, individual elements disclosed in the above-described embodiments are purported to include all of design changes and equivalents falling within the technical scope of the present invention.

The magnetic core according to the present invention just needs to include a laminated core in which multiple core thin strips are laminated one above another, and to include a cutting mark region formed by cutting tie sticks, connected to the core thin strips, in a lamination direction of the core thin strips, the cutting mark region being positioned on an inner side than outer peripheries of the core thin strips. While the above description is made in connection with an example in which the core assembly 50 (the laminated core) included in the magnetic core 100 is the laminate of the thin strip blocks 51, the core assembly 50 (the laminated core) may be constituted by the multiple nanocrystalline thin strips 511 without forming the fixedly joined portion 51B. The core assembly 50 (the laminated core) of the above-described configuration can be manufactured, for example, by neither forming the blocks in the "separation-cutting/block-forming" step of the step S206, nor executing the "rotary lamination" step of the step S207 in the manufacturing method represented in the flowchart of FIG. 5. In the step S206, simple cutting may be performed by laser cutting or machining without forming the blocks.

What is claimed is:

1. A magnetic core comprising:

a laminated core including a plurality of core thin strips which are laminated in a lamination direction, wherein the laminated core has cutting marks formed on a surface thereof other than an outermost side surface of the laminated core, the cutting marks being formed by separating the core thin strips from tie sticks connected thereto, by cutting the tie sticks in the lamination direction;

wherein each of the plurality of core thin strips comprises a body portion and a plurality of teeth extending radially and outwardly from an outer side surface of the body portion, each of the plurality of teeth comprises a distal end portion, and the outermost side surface of the laminated core is constituted by outermost side surfaces of the distal end portions of the plurality of teeth;

wherein the distal end portion comprises a protrusion protruding in a circumferential direction, and each of the cutting marks is disposed on a circumferential side surface of the protrusion of the distal end portion of a respective one of the plurality of teeth.

2. The magnetic core according to claim 1, wherein each core thin strip includes a portion made of a nanocrystal-containing alloy material that is obtained by nano-crystallizing an amorphous alloy material with a heat treatment.

3. The magnetic core according to claim 2, wherein a portion of the core thin strip in which the cutting marks are formed is made of the amorphous alloy material.

4. The magnetic core according to claim 2, wherein a portion of the core thin strip in which the cutting marks are formed is made of the nanocrystal-containing alloy material.

5. The magnetic core according to claim 1, wherein the laminated core includes:

at least one thin strip block in which the plurality of core thin strips are joined to each other in the lamination direction at fixing portions.

6. The magnetic core according to claim 5, wherein at least part of the fixing portions includes a portion of the core thin strips in which the cutting marks are formed.

7. The magnetic core according to claim 6, wherein the cutting marks in the fixing portions are fusion bonded.

8. The magnetic core according to claim 7, wherein the fixing portions are fusion bonded by laser cutting.

9. The magnetic core according to claim 5, wherein the laminated core includes a plurality of thin strip blocks which are assembled into a core assembly.

10. The magnetic core according to claim 9, wherein the plurality of thin strip blocks are arranged along a first direction in such a manner that the fixing portions of the plurality of thin strip blocks are not aligned in the first direction.

11. The magnetic core according to claim 1, further comprising:

an impregnated coating covering the laminated core.

12. A magnetic component comprising the magnetic core according to claim 1.

13. The magnetic component according to claim 12, wherein the magnetic component is a motor stator.

14. The magnetic component according to claim 12, wherein the magnetic component is a motor rotor.

15. The magnetic core according to claim 1, wherein the cutting marks are formed in each core thin strip at a location inside of an outer periphery of the core thin strip.

16. A hoop material for providing a plurality of core thin strips configured to be laminated in a lamination direction to form a magnetic core, the hoop material comprising:

at least one core thin strip segment corresponding one of the plurality of core thin strips, the at least one core thin strip segment comprising a body portion and a plurality of teeth extending radially and outwardly from an outer side surface of the body portion, each of the plurality of teeth comprising a distal end portion comprising a protrusion protruding in a circumferential direction;

a ribbon base provided along the core thin strip segment in a same plane; and at least one tie stick by which the ribbon base and a circumferential side surface of the protrusion are connected.

17. The hoop material according to claim 16, comprising:

a plurality of core thin strip segments, each of which is connected to the ribbon base via the at least one tie stick.

18. The hoop material according to claim 16, wherein the ribbon base is provided with a positioning portion associated with the core thin strip segment.

19. The hoop material according to claim 16, wherein the at least one tie stick is connected to the core thin strip segment at a location inside of an outer periphery of the core thin strip segment.

* * * * *